March 21, 1967  R. A. BOWKER  3,309,809
FISH ROD HANDLE
Filed Dec. 11, 1964
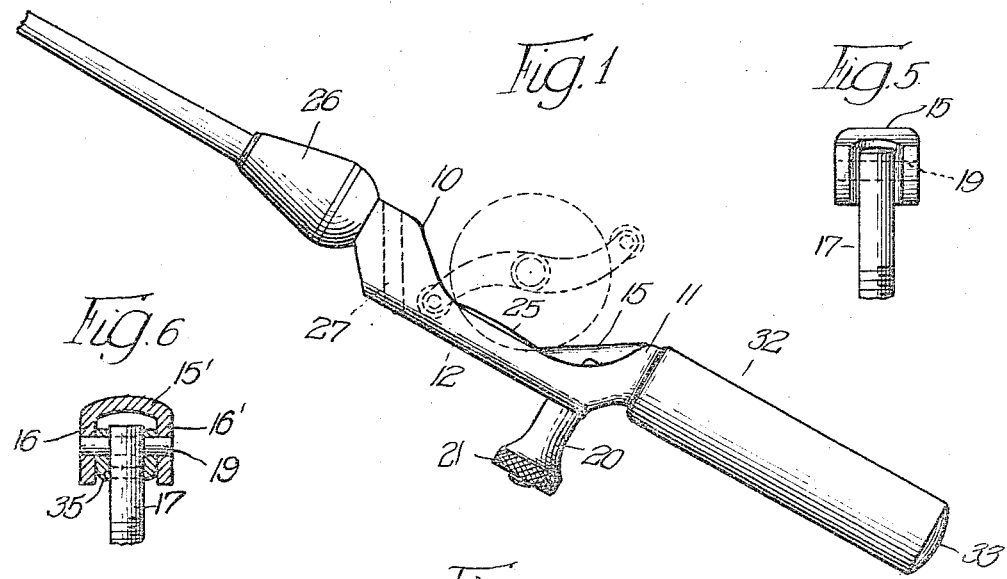
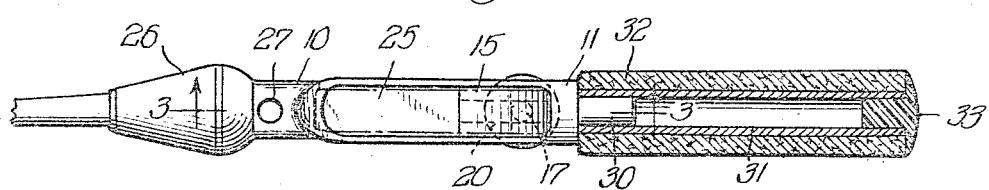
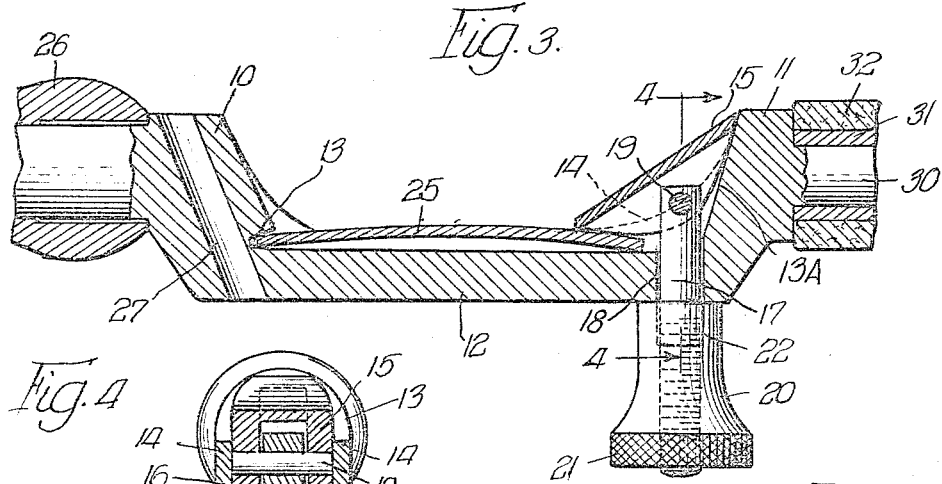
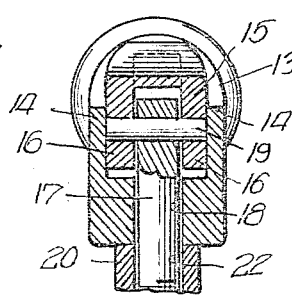
Inventor:
Rockton A. Bowker,
By George H. Simmons
Atty

3,309,809
FISH ROD HANDLE
Rockton A. Bowker, 2817 E. 76th Place,
Chicago, Ill. 60652
Filed Dec. 11, 1964, Ser. No. 417,675
7 Claims. (Cl. 43—22)

This invention relates to fish rod handles and has for its principal object the provision of a new and improved handle of this type.

It is a main object of the invention to provide a fish rod handle in which the base of a reel is clamped upon a reel receiving portion of the handle by a wedge located at the rear end of the reel base, which wedge is drawn down upon the receiving portion by a nut located beneath that portion and threaded upon a bolt the shank of which extends through the portion and is pivotally connected to the wedge.

Another object of the invention is to provide a fish rod handle in which the nut that forces the wedge down upon the reel base is shaped to provide a finger hold for the handle.

Another object of the invention is to provide in a fish rod handle having a hand grip end, a rod receiving end and a reel receiving portion disposed between said ends and offset from the axes of said ends, a sloping wall at the junction of said hand grip end and said reel receiving portion, against which wall a wedge moves to clamp a reel base upon said reel receiving portion, and in which the junction of the reel receiving portion and the rod receiving end contains a socket into which the front end of the reel base is forced as the wedge moves downwardly on said wall.

Another object of the invention is to provide a fish rod handle in which a rib upstands from each lateral edge of an inclined wall, is engaged by a wedge that is channel shape in cross-section and is disposed with the flanges of the wedge engaging said wall and said ribs to prevent rotation of the wedge as a nut is turned on the bolt.

Further objects of the invention not specifically mentioned here will be apparent from the detailed description and claims, reference being had to the drawings in which a preferred embodiment is shown by way of example and in which:

FIGURE 1 is a side elevational view of a fish rod handle embodying the teachings of the invention;

FIGURE 2 is a plan view partly in cross-section, of the handle shown in FIGURE 1;

FIGURE 3 is a cross-sectional view along the line 3—3 on FIGURE 2 looking in the direction of the arrows and drawn to an enlarged scale;

FIGURE 4 is a cross-sectional view along the line 4—4 on FIGURE 3 looking in the direction of the arrows;

FIGURE 5 is a fragmentary end view of a wedge as seen from the reel base engaging end thereof; and FIGURE 6 is a fragmentary cross-sectional view showing a modified form of wedge.

Prior art fish rod handles of which I am aware usually have been made of die cast aluminum or aluminum alloy and have consisted of a rod receiving end, a hand grip end and a reel receiving portion disposed between said ends and offset from the axes thereof. Such handles have usually contained a socket at the junction of the reel receiving portion and the rod receiving end into which the front end of a reel base has projected. Various arrangements for clamping the reel base on the handle have been used, the most common being a spring pressed block that overhangs the rear end of the reel base. The block has usually been carried upon a shaft telescoped into the hand grip portion of the handle. Such handles have usually been equipped with a finger hold shaped like the trigger of a gun and projected downwardly from the junction of the reel receiving portion and the hand grip end. Other handles have had a socket at the hand grip end of the reel receiving portion and a clamping block at the other end of that portion which block is clamped against the front end of a reel base by a screw.

The present invention provides a new and improved fish rod handle that is of simple design capable of being manufactured at low cost. In its preferred form the handle is provided with a sloping wall at the junction of the hand grip end and the reel receiving portion. A wedge pivotally mounted on the shank of a bolt engages this wall and the rear end of a reel base. The bolt projects through a perforation in the handle and is equipped with a nut through the operation of which the wedge is drawn downwardly to clamp the reel base in place.

The nut is somewhat mushroom shape and replaces the finger hold member of prior art handles. In use, the nut is placed between the index and second finger of the user's hand and the rod and reel held so that the axis around which the spool of the reel rotates is disposed vertically. Through this arrangement a firm grip on the handle can be maintained during casting and the danger of the rod slipping out of the user's hand is minimized, if not eliminated. The arrangement also results in a better wrist action during casting.

Referring now to the drawings in more detail: In FIGURE 1 it will be seen that the fish rod handle of the present invention consists of a rod receiving end portion 10, a handle grip portion 11 and a reel mounting portion 12 disposed between portions 10 and 11 and offset from the axes thereof.

As will be seen best in FIGURE 3 the reel receiving portion 12 contains a socket 13 at the junction of portions 10 and 12 into which socket the base of a reel is projected.

At the junction of the hand grip portion 11 and the reel mounting portion 12 I have provided a sloping wall 13A that has flanges or ribs 14 upstanding from its lateral edges.

Disposed against the sloping wall 13A is a clamping wedge 15, preferably channel shape in cross-section. As will be seen in FIGURE 4 the flanges 16 of wedge 15 engage the ribs 14 to prevent rotation of the wedge with respect to the handle. Wedge 15 is shown as a die cast member the flanges of which are thicker than the web. As will be seen in FIGURE 5 the end of the wedge 15 that engages the reel mounting base, i.e. the left end in FIGURE 3, contains an arcuate portion to conform to the shape of reel bases.

The shank of a headless bolt 17 projects through an opening 18 in the member 12 and the wedge 15 is pivotally attached to the bolt 17 by a pivot pin 19.

Threaded upon the bolt 17 is a cylindrical nut 20 which flares outwardly as best seen in FIGURE 3. The cylindrical lower end of the nut 20 is knurled as indicated at 21. A counterbore 22 in the nut permits it to extend over the unthreaded portion of the bolt 17.

When it is desired to attach a reel to the handle, nut 20 is backed off sufficiently to permit the bolt 17 and wedge 15 to move upwardly far enough to permit placing the rear end of a reel base 25 under the wedge 15 with its forward end projecting into the socket 13.

As the nut is tightened, wedge 15 moves downwardly along the sloping wall 13A and its engagement with the reel base 25 forces the base forwardly to insure that it extends into the socket 13A as far as possible. Downward movement of the wedge 15 clamps the rear end of the reel base 25 onto the portion 12 thereby securely attaching the reel to the handle.

The metal portion of the handle may conveniently be made as a die casting of aluminum or aluminum alloy having at its front end a rod attaching arrangement forming no part of the present invention and shown as a conventional chuck 26. As shown, the forward end of the handle is provided with a perforation 27 to facilitate mounting the handle upon a support, for example, upon the pin of the trolling device shown in my Patent 2,992,- 505, issued July 18, 1961. If desired, the perforation can be omitted since the teachings of the invention are equally applicable to more conventional fish rod handles.

The die cast portion of the handle shown in the drawings terminates in a cylindrical boss 30 to which I attach an aluminum tube 31 in suitable manner such as by an epoxy type glue. The tube 31 is covered with a covering 32 preferably composed of cork and fixed to the tube 31 in suitable manner such as by glueing. If desired, the outer surface of the tube 31 can be roughened to facilitate glueing. The distal end of the tube 31 is closed by a non-metallic plug 33, preferably composed of plastic and shaped to extend radially outwardly to protect the end of the cork grip 32.

With the reel mounted upon the handle and the rod attached thereto, during casting the nut 20 is placed between the index and second finger of the user's hand and the handle turned so that the axis of the spool of the reel is disposed vertically. This places the user's thumb in convenient position for controlling the spinning of the spool in the usual manner. Through this arrangement the handle is held securely in the hand of the user without the necessity of tightly gripping the handle and, as a result, a freer wrist action is possible during casting. It will be noted that the exposed web of the wedge 15 is smooth and flat so there is no danger of the line being caught on the wedge should a snarl develop.

The nut 20 can be made of metal or of a plastic which is less chilling to the hand of the user than a metal.

As shown in FIGURE 4 the wedge is a die cast member. However, in certain instances it may be advantageous to stamp the wedge from a sheet of aluminum of desired thickness. Such construction is shown in FIGURE 6 from which it will be seen that the web 15' and the flanges 16' are of the same thickness. To properly center the bolt 17 in the wedge it is necessary to provide an inner channel 35 stamped from aluminum and having a perforation in its web through which the bolt 17 projects. The pin 19 projects through the bolt 17 and the flanges of both channels. The bolt is properly centered by the web of the inner channel.

My improved handle is advantageous since it employs a positive clamping of a reel on the reel seat portion. Many prior art handles of which I am aware, clamp the reel base by a wedge that is spring pressed along the axis of the hand grip portion of the handle. As a result, if the handle is dropped in such a manner that it lands on its butt end, the inertia of the reel overcomes the spring tension and the reel falls off of the handle. In my handle, the wedge block is clamped by pressure applied at right angles to the axis of the hand grip portion and the inertia of the reel cannot reduce the clamping pressure consequently the reel does not fall off of the handle.

From the foregoing it will be apparent that the fish rod handle of the present invention is a sturdy device that can be manufactured at low cost without sacrificing quality. By replacing the usual finger hold with the nut 20 and shaping the nut so as to fit between the index and second fingers of the user's hand, the rod can be securely held with the hand remaining in somewhat relaxed condition and free wrist action during casting is achieved and the danger of the rod slipping out of the user's hand is minimized, if not entirely eliminated.

While I have chosen to show my invention by illustrating and describing a preferred embodiment of it, I have done so by way of example only as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:
1. A fishing rod handle comprising:
   (1) a hand grip portion;
   (2) a rod receiving portion;
   (3) a middle portion disposed between the hand grip and the rod receiving portion and having a surface, offset from the axes of said portions, adapted to receive a reel base;
   (4) a sloping wall at the junction of said surface and said grip portion;
   (5) a socket at the junction of said surface and said rod receiving portion adapted to receive the forward end of a reel base;
   (6) a wedge engaging said sloping wall and overhanging the rear end of a reel base;
   (7) and means for forcing said wedge downwardly on said sloping wall thereby to force the forward end of a reel base into said socket and to clamp the rear end of the base onto said surface to secure the reel upon the handle.

2. A fishing rod handle as specified in claim 1 in which a cylindrical finger hold depends from the junction of said hand grip and middle portions and flares outwardly into a larger diameter cylindrical portion at the bottom of the finger hold.

3. A fishing rod handle as specified in claim 1 in which the means for forcing said wedge consists of a bolt the shank of which is pivotally connected to the wedge and extends through an opening in the middle portion of the handle and a nut threaded on said bolt and engaging the under side of said middle portion.

4. A fishing rod handle as specified in claim 3 in which the wedge is channel shape in cross-section and in which the bolt is attached thereto by a pin that extends through the flange portions of the wedge and through the shank of the bolt.

5. A fishing rod handle as specified in claim 4 in which ribs upstand from the lateral edges of the sloping wall and are engaged by the flanges on the wedge to maintain the wedge aligned laterally with respect to the sloping wall.

6. A fishing rod handle as specified in claim 4 in which the distance between the flanges on the wedge is greater than the diameter of the shank of the bolt and in which there is a channel-shaped spacer through a perforation in the web of which the bolt extends to center the bolt between the flanges and in which the pin extends through perforations in the flanges of the spacer.

7. A fishing rod handle as specified in claim 1 in which the handle is composed of metal and terminates in a cylindrical boss at the hand grip end of the handle to which boss is fixed a tube that is covered on its outer surface by a cork member, which tube is closed at its distal end by a non-metallic plug that overhangs the end of the cork member.

References Cited by the Examiner
UNITED STATES PATENTS

| | | | |
|---|---|---|---|
| 2,583,831 | 1/1952 | Goergen | 43—22 X |
| 2,583,909 | 1/1952 | Warth | 43—22 |
| 2,777,240 | 1/1957 | Hutchison | 43—22 |
| 2,839,863 | 6/1958 | Heffel | 43—22 |

SAMUEL KOREN, *Primary Examiner.*

D. J. LEACH, *Assistant Examiner.*